(12) United States Patent
Barbat et al.

(10) Patent No.: US 9,193,318 B2
(45) Date of Patent: Nov. 24, 2015

(54) STEPPED DUAL TUBE DEFLECTOR

(71) Applicant: Ford Global Technologies, LLC, Dearborn, MI (US)

(72) Inventors: Saeed David Barbat, Novi, MI (US); Mohamed Ridha Baccouche, Ann Arbor, MI (US); Jamel E. Belwafa, Ann Arbor, MI (US); Rahul Arora, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 14/053,151

(22) Filed: Oct. 14, 2013

(65) Prior Publication Data

US 2015/0102635 A1      Apr. 16, 2015

(51) Int. Cl.
*B60R 19/16*      (2006.01)
*B62D 25/08*      (2006.01)
*B62D 21/15*      (2006.01)

(52) U.S. Cl.
CPC .............. *B60R 19/16* (2013.01); *B62D 21/152* (2013.01); *B62D 25/082* (2013.01)

(58) Field of Classification Search
CPC .... B62D 25/082; B62D 21/152; B60R 19/54; B60R 19/16
USPC ..................................................... 296/187.09
See application file for complete search history.

(56) References Cited

U.S. PATENT DOCUMENTS

| | | | |
|---|---|---|---|
| 5,419,416 A | 5/1995 | Miyashita et al. | |
| 5,819,408 A | 10/1998 | Catlin | |
| 6,957,846 B2 | 10/2005 | Sacki | |
| 7,819,218 B2 | 10/2010 | Eichberger et al. | |
| 8,398,153 B1 | 3/2013 | Dandekar et al. | |
| 8,398,154 B1 | 3/2013 | Nusier et al. | |
| 2008/0290674 A1 | 11/2008 | Yang et al. | |
| 2014/0062106 A1* | 3/2014 | Han ............................... | 293/133 |

(Continued)

FOREIGN PATENT DOCUMENTS

| | | |
|---|---|---|
| CN | 101022977 A | 8/2007 |
| CN | 103359176 A | 10/2013 |

(Continued)

OTHER PUBLICATIONS

Dr. Hamidreza Zarei et al., Crashworthiness Investigation and Optimization of Empty and Foam Filled Composite Crash Box, Aeronautical University, Tehran, Iran; Institute of Machine Elements, Design and Manufacturing, University of Technology Freiberg, Germany, Published online Aug. 2010.

(Continued)

*Primary Examiner* — Glenn Dayoan
*Assistant Examiner* — Melissa A Black
(74) *Attorney, Agent, or Firm* — Raymond L. Coppiellie; Brooks Kushman P.C.

(57) ABSTRACT

A front end assembly including a stepped deflector assembly. The stepped deflector assembly includes a first step attached to one end of a bumper. The first step includes an inner front leg and an intermediate leg. The second step includes an outer front leg and a rear leg. The intermediate leg and rear leg have ends that are disposed adjacent a frame rail, but that are not attached to the frame rail. In a collision, the first and second inner ends of the first and second step, respectively, are driven laterally into the frame rail to reduce intrusions into the passenger compartment of the vehicle.

18 Claims, 5 Drawing Sheets

(56) References Cited

U.S. PATENT DOCUMENTS

| | | |
|---|---|---|
| 2014/0084633 A1 | 3/2014 | Matsuda et al. |
| 2014/0084635 A1 | 3/2014 | Matsuda et al. |
| 2014/0367981 A1 | 12/2014 | Zaluzec et al. |
| 2015/0102635 A1 | 4/2015 | Barbat et al. |
| 2015/0158441 A1 | 6/2015 | Nusier et al. |

FOREIGN PATENT DOCUMENTS

| | | |
|---|---|---|
| DE | 102004016839 A1 | 11/2005 |
| DE | 202014105462 U1 | 1/2015 |
| EP | 2540575 A2 | 1/2013 |
| EP | 2692589 A1 | 2/2014 |
| WO | 2014069108 A1 | 5/2014 |
| WO | 2014088117 A1 | 6/2014 |

OTHER PUBLICATIONS

Ali Seyed Yaghoubi, et al., SAE International, Frontal Impact Responses of Generic Steel Front Bumper Crush Can Assemblies, 2014-01-0550, Published Apr. 1, 2014.

* cited by examiner

STEPPED DUAL TUBE DEFLECTOR

TECHNICAL FIELD

This disclosure relates to an apparatus for reducing intrusions into the passenger compartment of a vehicle when subjected to a small overlap rigid barrier test.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provided the primary support for the vehicle body. The extent of any intrusions into the passenger compartment are measured at the brake pedal, foot rest, left toe pan, center toe pan, right toe pan, left instrument panel, right instrument panel, and door.

An Insurance Institute for Highway Safety (IIHS) test simulates small overlap frontal crashes against a rigid barrier. In the proposed test, the vehicle impacts a rigid barrier having a six inch pole-like radius on one corner with a 25% overlap at 40 MPH. The impact is outboard of the frame rails and the frame rails do not provide as much resistance to intrusion into the passenger compartment as in the case of impacts between the frame rails.

Deflectors that are attached to the outer end of a vehicle bumper have been tested and have reduced intrusions into the passenger compartment. Additional reduction of intrusions in the small overlap rigid barrier (SORB) test results are desired that are simple and cost effective.

This disclosure is directed to solving the above problems and other problems as summarized below.

SUMMARY

According to one aspect of this disclosure, a stepped deflector is provided for a vehicle that absorbs a force of an impact with an object that is longitudinally aligned with the deflector outboard of a frame rail. The stepped deflector includes a first step and a second step. The first step includes a front leg extending outboard from the bumper; and an intermediate leg extending from the front leg toward the frame rail. The second step includes an outer front leg attached to the first step extending outboard from the first step; and a rear leg extending from an outer end of the outer front leg toward the frame rail.

According to another aspect of this disclosure, a front-end assembly is provided for a vehicle that absorbs a force of an impact with an object that is longitudinally aligned with the deflector outboard of a frame rail. The front end assembly includes the frame rail and a bumper disposed in front of the frame rail. The stepped deflector includes a first step including an inner front leg extending outboard from and attached to the bumper; and an intermediate rear leg extending from an outer end of the front leg toward the frame rail. A second step includes an outer front leg attached to the first step extending outboard from the first step; and a rear leg extending from an outer end of the outer front leg toward the frame rail.

According to a different aspect of this disclosure, an impact absorbing apparatus is disclosed for a front-end of a vehicle having a bumper and a frame rail. The apparatus absorbs a force of an impact with an object that is longitudinally aligned with the deflector outboard of the frame rail. The impact absorbing apparatus is a stepped deflector that is attached to the bumper. The stepped deflector includes a first step including a front leg extending outboard from the bumper and an intermediate leg extending from the front leg toward the frame rail. The stepped deflector also includes a second step including an outer front leg attached to the first step extending outboard from the first step; and a rear leg extending from an outer end of the outer front leg toward the frame rail. The force of an impact is initially absorbed by the front leg that causes the intermediate leg to engage the frame rail. The force is subsequently absorbed by the outer front leg that causes the rear leg to engage the frame rail behind the intermediate leg.

Any of the above embodiments of the stepped deflector may further comprise the front leg and outer front leg extending rearward from the bumper at an acute angle a relative to the frame rail. The intermediate leg may be straight and may have a first inner end unattached to the frame rail. The rear leg may be straight and may have a second inner end unattached to the frame rail. Alternatively, the intermediate leg may be arc-shaped and may have a first inner end unattached to the frame rail. The rear leg may be arc-shaped and may have a second inner end unattached to the frame rail.

Additional aspects of the above embodiments of the stepped deflector may also include that the frame rail is reinforced by a laterally extending cross-member where the intermediate leg engages the frame rail. Alternatively, or in addition, the frame rail may be reinforced by another laterally extending cross-member disposed where the rear leg engages the frame rail. The laterally extending cross-members function to increase the lateral stiffness of the frame rails.

The above aspects of this disclosure and other aspects are described in greater detail below with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
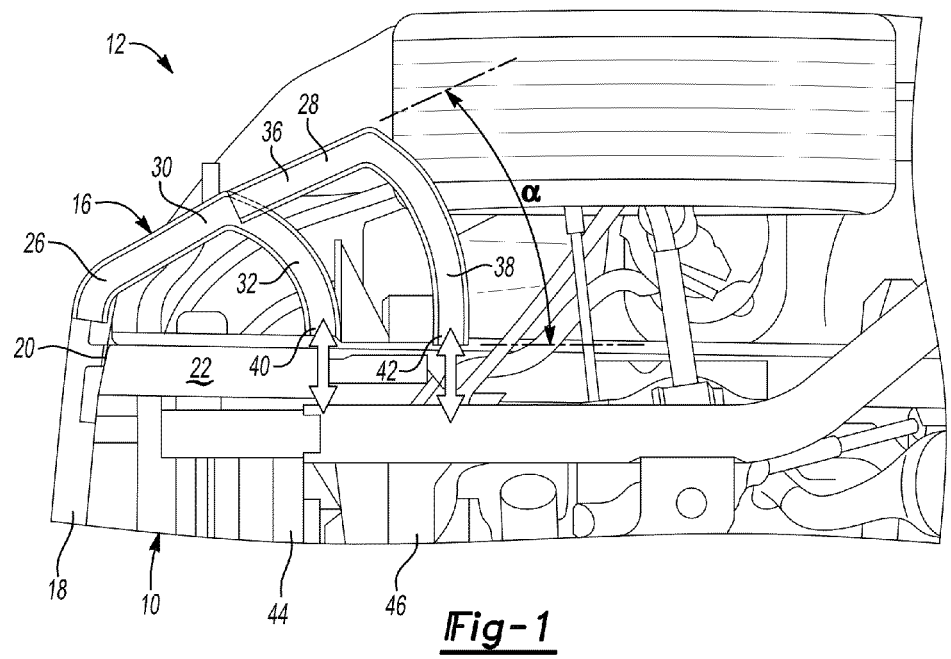
FIG. 1 is a fragmentary bottom plan view of a portion of a front-end of a vehicle including dual deflector tubes having diagonally extending front legs and arc-shaped supporting legs according to one embodiment of this disclosure.

Referring to FIG. 1, a front end 10 of a vehicle 12 is illustrated in a bottom plan view that includes one embodiment of a stepped deflector assembly 16 that is attached to one lateral end of a bumper 18. The bumper 18 is attached to a front end 20 of a frame rail 22.

The stepped deflector assembly 16 includes a first step 26 and a second step 28. The first step 26 includes an inner front leg 30 and an intermediate leg 32. The second step 28 includes an outer front leg 36 and a rear leg 38.

The inner front leg 30 and outer front leg 36 extend at an angle a relative to the longitudinally extending frame rail 22.

The intermediate leg 32 includes a first inner end 40 that is disposed adjacent the frame rail 22, but is not attached to the frame rail 22. The second inner end 42 of the rear leg 38 is also disposed adjacent the frame rail 22, but is unattached to the frame rail 22. The first and second inner ends 40 and 42 are not attached to the frame rail 22 to avoid interference with the functioning of the crush-can in a collision with an object by the bumper 18 between the frame rails 22 of the vehicle 12.

A first laterally extending cross member 44 is secured between the frame rail 22 and a second frame rail (not shown). The first laterally extending cross member 44 is aligned with the first inner end 40 of the intermediate leg 32. The first laterally extending cross member 44 increases the lateral stiffness of the frame rail at the location where the intermediate leg engages the frame rail in a collision with an object that is longitudinally aligned with the stepped deflector assembly 16. A second laterally extending cross member 46 may be provided that is aligned with the second inner end 42 of the rear leg 38. The first laterally extending cross member 44 and second laterally extending cross member 46 may both be provided or one or the other cross member may be omitted depending upon the degree of lateral stiffness required of the frame rail 22.

The intermediate leg 32 and rear leg 38, as shown in FIG. 1, are arc-shaped legs that extend from an outer end of the inner front leg 30 and outer front leg 36, respectively.

Figure 2:
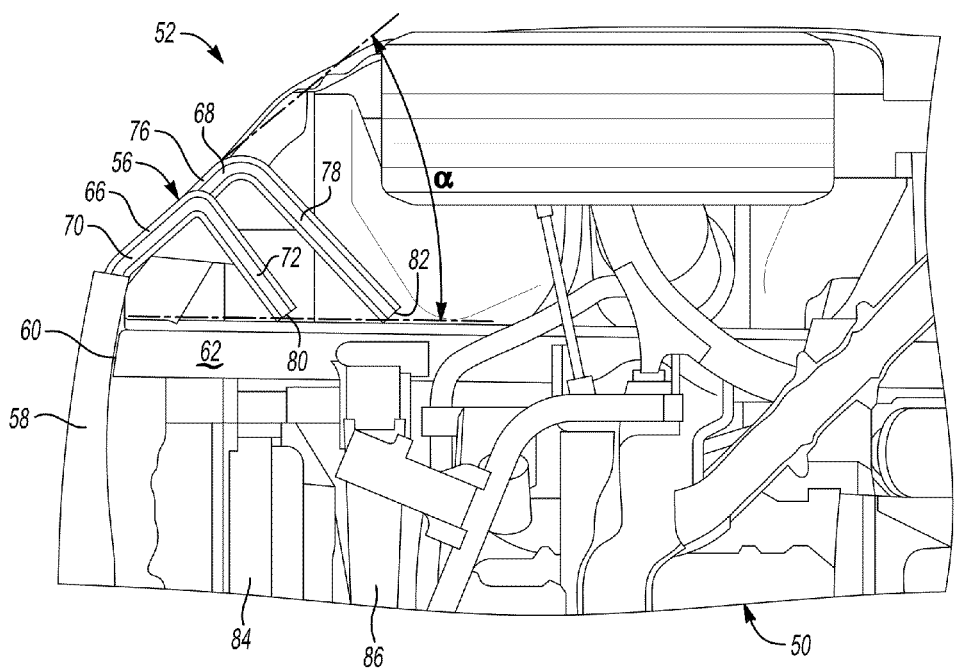
FIG. 2 is a fragmentary bottom plan view of a portion of a front-end of a vehicle including dual deflector tubes having diagonally extending front legs and perpendicular supporting legs according to one embodiment of this disclosure.

Referring to FIG. 2, an alternative embodiment to the embodiment of FIG. 1 is illustrated. In FIG. 2, a front end 50 of a vehicle 52 is illustrated in a bottom plan view. A stepped deflector 56 is attached to an outer end of a bumper 58. The bumper 58 is attached to a forward end 60 of a frame rail 62.

The stepped deflector assembly 56 includes a first step 66 and a second step 68. The first step 66 includes an inner front leg 70 and an intermediate leg 72. The second step 68 includes an outer front leg 76 and a rear leg 78. The inner front leg 70 and outer front leg 76 extend at an angle α relative to the frame rail 62. A first inner end 80 of the intermediate leg 72 and a second inner end 82 of the rear leg 78 are both disposed adjacent to the frame rail 62. The inner ends 80 and 82 are not attached to the frame rail 62 to avoid interference with the collision absorption mechanism, such as a crush-can (not shown), that are intended to absorb the energy of a collision with an object between the frame rails 62 of the vehicle 52.

A first laterally extending cross member 84 is generally aligned with the first inner end 80 of the intermediate leg 72. A second laterally extending cross member 86 is aligned with the second inner end 82 of the rear leg 78. The first and second laterally extending cross members 84 and 86 reinforce the frame rail 62 in the lateral direction to increase the lateral stiffness of the frame rails 22.

Figure 3:
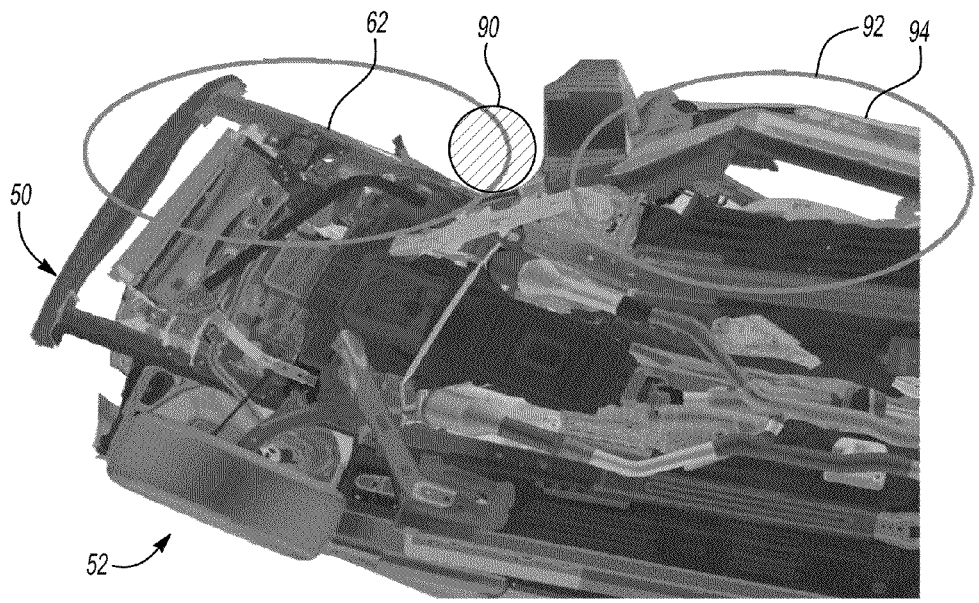
FIG. 3 is a bottom perspective view of a graphic representation of a base vehicle in a simulated collision with a rigid barrier.

Referring to FIG. 3, the front end 50 of a vehicle is a base vehicle is shown after colliding with a rigid barrier 90 in a small overlap rigid barrier (SORB) test that simulates a collision of a vehicle 52 outboard of a frame rail 62. Circle 92 highlights the rocker area of the vehicle and shows the rocker panel 94 separated from the floor of the vehicle 52.

Figure 4:
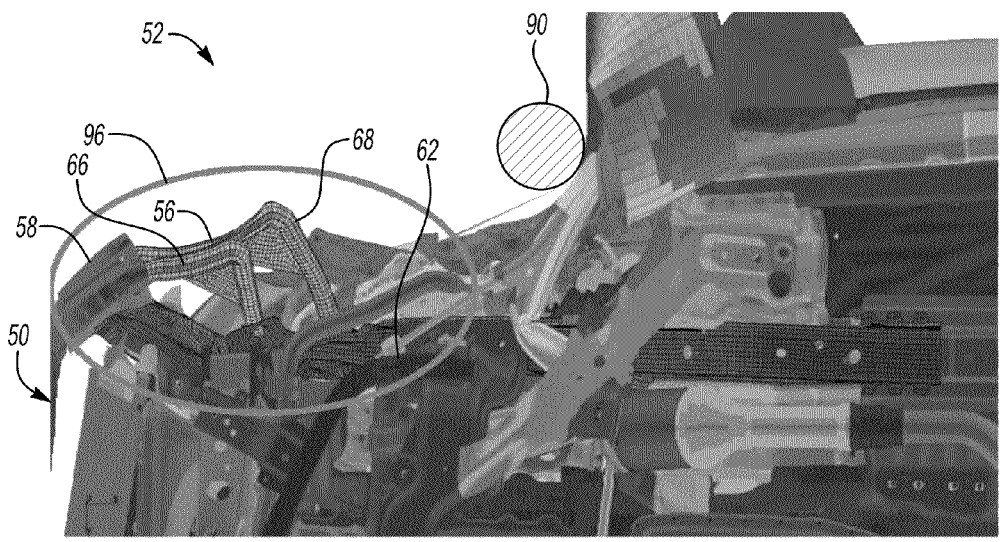
FIG. 4 is a bottom perspective view of a graphic representation of a rocker deformation in a base vehicle with a stepped deflector in a simulated collision with a rigid barrier.
Figure 5:
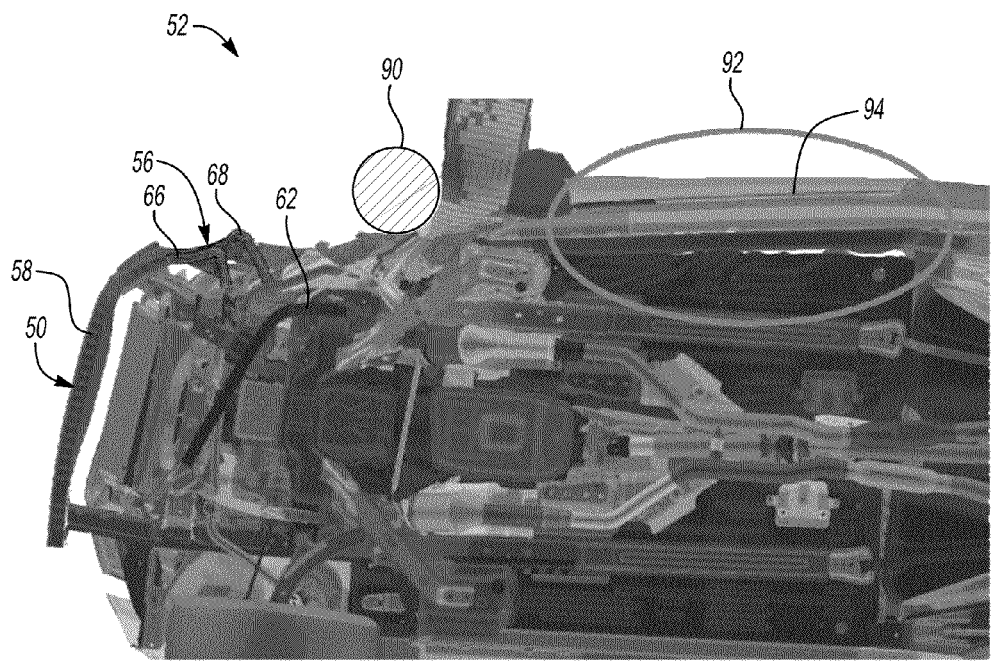
FIG. 5 is a bottom perspective view of a graphic representation of a base vehicle with a stepped deflector in a simulated collision with a rigid barrier.

Referring to FIGS. 4 and 5, the front end 50 of the vehicle 52 that is equipped with a stepped deflector assembly 56 is illustrated after a simulated collision with a rigid barrier 90, such as a pole. The collision with the rigid barrier is at a location that is longitudinally aligned with the stepped deflector assembly 56. The stepped deflector assembly 56 includes a first step 66 and a second step 68, as previously described with reference to FIG. 2. The stepped deflector assembly 56 is attached to the bumper 58. Referring specifically to FIG. 5, a circle 92 around the rocker area of the vehicle 52 shows that the rocker panel 94 is less deformed and is only minimally separated from the floor of the vehicle 52.

Figure 6:
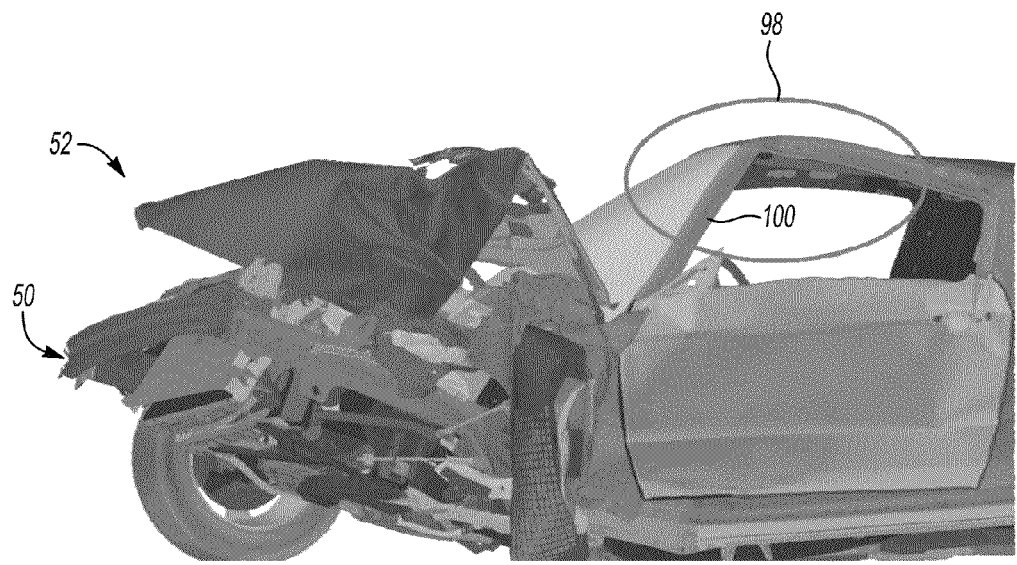
FIG. 6 is a side elevation view of a graphic representation of a base vehicle in a simulated collision with a rigid barrier.

Referring to FIG. 6, a base CAE model vehicle 52 is shown after a simulated collision in a SORB test is highlighted with a circle 98 indicating the deformation around the A-pillar 100 of the vehicle 52.

Figure 7:
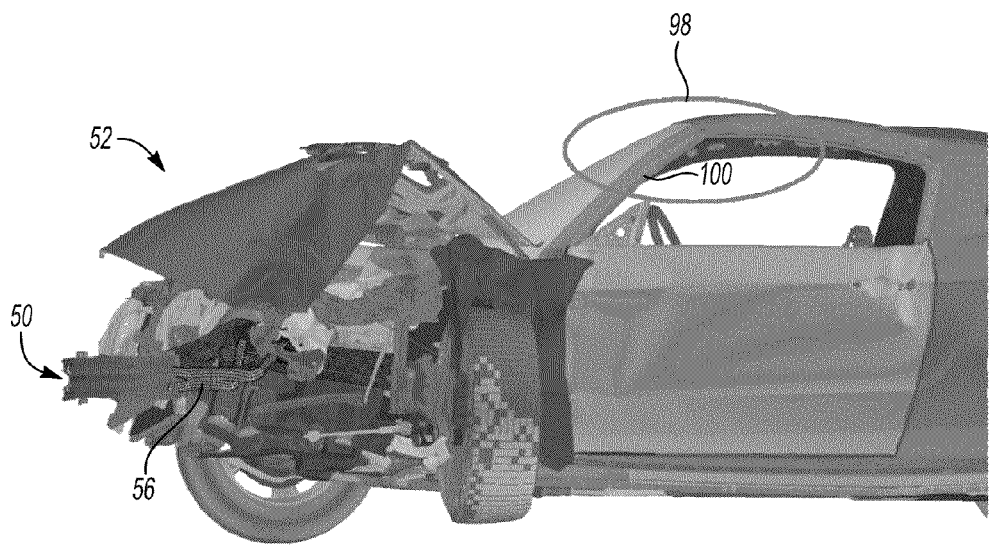
FIG. 7 is a side elevation view of a graphic representation of a base vehicle with a stepped deflector in a simulated collision with a rigid barrier.

Referring to FIG. 7, the vehicle 52 provided with a stepped deflector assembly 56 is illustrated for comparison with the base CAE model shown in FIG. 6. Circle 98 indicates the area where the A-pillar 100 is deformed and it can be seen that substantially less deformation occurs within the circled area indicated by reference numeral 98. The A-pillar 100 in FIG. 7 is shown to have substantially less deformation than the A-pillar 100 of the base vehicle shown in FIG. 6.

Figure 8:
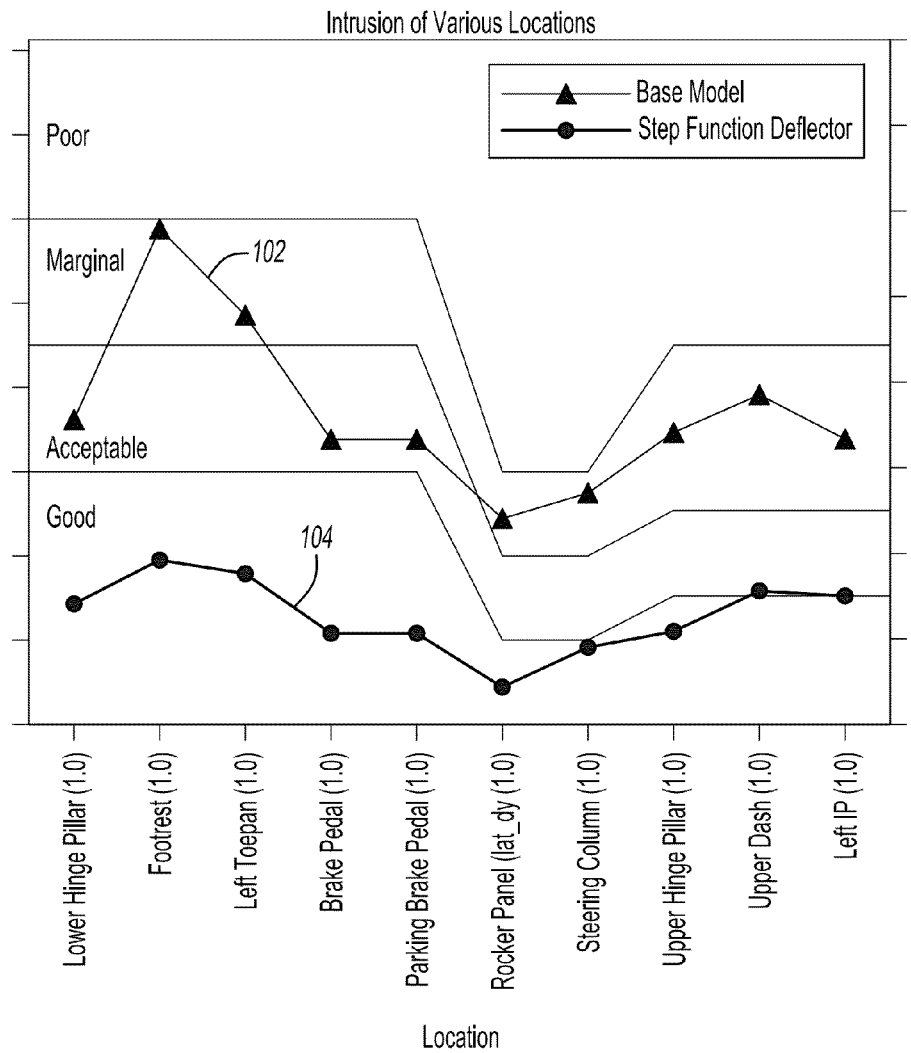
FIG. 8 is a graph showing the extent of intrusion at different locations into the passenger compartment of a base vehicle compared to a base vehicle with a stepped deflector as monitored in a small overlap rigid barrier test of the embodiment illustrated in FIG. 1.

Referring to FIG. 8, a chart of intrusions is provided comparing the base model illustrated by line 102 to a CAE simulated test of a base model provided with a stepped deflector corresponding to the embodiment of FIG. 2 is represented by line 104. A marked improvement from marginal to good performance for the base model is shown by the line 104. The line 104 for the base model including the stepped deflector indicates that there is substantially less intrusion across the board. For example, at the lower hinge pillar, intrusion is reduced from 175 mm for the base model to 75 mm for the model with the stepped deflector assembly. At the footrest area, intrusion is reduced from 300 mm in the base model to 100 mm in the vehicle provided with a stepped deflector. On average, the stepped deflector at each measurement point reduces the extent of intrusion by more than one-half when comparing the vehicle provided with a stepped deflector to the base model. This reduction in the extent of intrusion is a significant reduction and a considerable improvement toward the goal of meeting requirements of the SORB test.

While exemplary embodiments are described above, it is not intended that these embodiments describe all possible forms of the disclosure. The words used in the specification are words of description rather than limitation. Changes may be made to the illustrated embodiments without departing from the spirit and scope of the disclosure as claimed. The features of the illustrated embodiments may be combined to form further embodiments of the disclosed concepts.

What is claimed is:

1. A stepped deflector for a vehicle comprising:
a first step including a front leg extending outboard from a bumper and an intermediate leg extending from the front leg toward a frame rail; and a second step including an outer front leg attached to the first step extending outboard from the first step and a rear leg extending from an outer end of the outer front leg toward the frame rail.

2. The deflector of claim 1 wherein the front leg and outer front leg extend rearward from the bumper at an acute angle a relative to the frame rail.

3. The deflector of claim 1 wherein the intermediate leg is straight and has a first inner end unattached to the frame rail and the rear leg is straight and has a second inner end unattached to the frame rail.

4. The deflector of claim 1 wherein the intermediate leg is arc-shaped and has a first inner end unattached to the frame rail and the rear leg is arc-shaped and has a second inner end unattached to the frame rail.

5. The deflector of claim 1 wherein the frame rail is reinforced by a laterally extending cross-member that increases lateral stiffness of the frame rail, and wherein the intermediate leg engages the frame rail where the cross-member reinforces the frame rail.

6. The deflector of claim 1 wherein the frame rail is reinforced by a laterally extending cross-member that increases lateral stiffness of the frame rail, and wherein the rear leg engages the frame rail where the cross-member reinforces the frame rail.

7. A front-end assembly for a vehicle comprising:
a frame rail;
a bumper disposed in front of the frame rail;
a stepped deflector including:
a first step including an inner front leg extending outboard from and attached to the bumper and an intermediate rear leg extending from an outer end of the front leg toward the frame rail; and
a second step including an outer front leg attached to the first step extending outboard from the first step and a rear leg extending from an outer end of the outer front leg toward the frame rail.

8. The front-end assembly of claim 7 wherein the front leg and outer front leg extend rearward from the bumper at an acute angle a relative to the frame rail.

9. The front-end assembly of claim 7 wherein the intermediate leg is straight and has a first inner end unattached to the frame rail and the rear leg is straight and has a second inner end unattached to the frame rail.

10. The front-end assembly of claim 7 wherein the intermediate leg is arc-shaped and has a first inner end unattached to the frame rail and the rear leg is arc-shaped and has a second inner end unattached to the frame rail.

11. The front-end assembly of claim 7 wherein the frame rail is reinforced by a laterally extending cross-member that increases lateral stiffness of the frame rail, and wherein the intermediate leg engages the frame rail where the cross-member reinforces the frame rail.

12. The front-end assembly of claim 7 wherein the frame rail is reinforced by a laterally extending cross-member that increases lateral stiffness of the frame rail, and wherein the rear leg engages the frame rail where the cross-member reinforces the frame rail.

13. An impact absorbing apparatus for a front-end of a vehicle having a bumper and a frame rail comprising:
a stepped deflector attached to the bumper including:
a first step including a front leg extending outboard from a bumper and an intermediate leg extending from the front leg toward the frame rail; and
a second step including an outer front leg attached to the first step extending outboard from the first step and a rear leg extending from an outer end of the outer front leg toward the frame rail, wherein a force of an impact with an object that is longitudinally aligned with the deflector is initially absorbed by the front leg causing the intermediate leg to engage the frame rail and subsequently absorbed by the outer front leg causing the rear leg to engage the frame rail behind the intermediate leg.

14. The impact absorbing apparatus of claim 13 wherein the front leg and outer front leg extend rearward from the bumper at an acute angle a relative to the frame rail.

15. The impact absorbing apparatus of claim 13 wherein the intermediate leg is straight and has a first inner end unattached to the frame rail and the rear leg is straight and has a second inner end unattached to the frame rail.

16. The impact absorbing apparatus of claim 13 wherein the intermediate leg is arc-shaped and has a first inner end unattached to the frame rail and the rear leg is arc-shaped and has a second inner end unattached to the frame rail.

17. The impact absorbing apparatus of claim 13 wherein the frame rail is reinforced by a laterally extending cross-member that increases lateral stiffness of the frame rail, and wherein the intermediate leg engages the frame rail where the cross-member reinforces the frame rail.

18. The impact absorbing apparatus of claim 13 wherein the frame rail is reinforced by a laterally extending cross-member that increases lateral stiffness of the frame rail, and wherein the rear leg engages the frame rail where the cross-member reinforces the frame rail.

* * * * *